United States Patent [19]

Urbanczyk

[11] 4,104,048

[45] Aug. 1, 1978

[54] MANURE TREATING PROCESS

[76] Inventor: Marvin L. Urbanczyk, Rte. 2, White Deer, Tex. 79097

[21] Appl. No.: 751,153

[22] Filed: Dec. 16, 1976

Related U.S. Application Data

[63] Continuation-in-part of Ser. No. 550,272, Oct. 18, 1975, Pat. No. 4,019,723.

[51] Int. Cl.² ............................................. C05F 11/08
[52] U.S. Cl. .............................................. 71/9; 71/15; 71/21
[58] Field of Search ............ 71/9, 8, 11, 15, 21, 71/23; 23/259.1; 195/104, 109

[56] References Cited

U.S. PATENT DOCUMENTS

| | | | |
|---|---|---|---|
| 3,323,896 | 6/1967 | Brown | 71/9 |
| 3,357,812 | 12/1967 | Shell | 71/9 |
| 3,438,740 | 4/1969 | Brown | 71/9 X |

Primary Examiner—Charles N. Hart
Assistant Examiner—Ferris H. Lander
Attorney, Agent, or Firm—Brady, O'Boyle & Gates

[57] ABSTRACT

A mobile apparatus repeatedly moves the central front opening of a drum and flail compartment thereof over elongated large masses of inoculated manure and moves the drum and flail assembly therein through each of the masses to repeatedly flail it, mix it, cool it and aerate it and, by co-action of a sprayer apparatus, moisten the particles of each resultant mass while in a state of dispersion, and form the resultant moistened particulate mass by flexible skirt members outlining a rear outlet opening into a pile of readily dispersed useful granulated so

MANURE TREATING PROCESS

CROSS REFERENCE TO RELATED APPLICATIONS

This is a continuation in part application of my co-pending application Ser. No. 550,272 filed Oct. 18, 1975, entitled Manure Treatment Apparatus and Process as filed, now U.S. Pat. No. 4,019,723, 4/26/77.

BACKGROUND OF THE INVENTION

1. The Field of the Invention:

The field of art to which this invention pertains is Processes of Treating Organic Material containing matter such as manure (Class 195, Sub-Class 21, United States Patent Office Manual of Classification).

2. Description of the Prior Art:

Compost production is long known as reported in the 1957 Yearbook of Agriculture, United States Department of Agriculture, Chapter entitled "Composts, Peats and Sewage Sludge", pages 237–252, and "Handbook of Food and Agriculture" by Blanck, F. C. Reinhold, 1955, Chapter 4 — Fertilizers, but apparatus and process treatment therefor applicable to large volumnes of manure available at feedlots where disposal of large volumes of cattle manure is a serious disposal problem has been lacking notwithstanding availability of apparatus of related art such as U.S. Pat. Nos. 3,451,781, 3,331,676, 2,200,107 and 1,029,378. Handling the manure has particularly been a sticky problem.

SUMMARY OF THE INVENTION

The process comprises the steps of selectively reducing the size of larger particles or agglomerates in the initial feed, and, during subsequent repeated treatment of the resulting flailed mass, selectively applying moisture to the finer particles of such masses while producing thorough mixing of the particles of intermediate sizes and rapidly producing a flowable granular product readily dispensed. This process thus rapidly provides a useful agricultural product while removing undesirable cow manure from locations where its presence is undesirable.

The apparatus has selective drive of each of its front wheels which are in advance of an enclosed drum and flail assembly and selectively elevatable to operate reliably without clogging or skewing. The flail and drum assembly thereof selectively reduce the size of the large and tough agglomerates of manure as initially recovered from feedlots. Because of widely spaced flails, it does not overgrind or overdry the material while mixing the masses in later stages of fermentaton for rapid conversion thereof. As the apparatus has a flail and drum assembly, after treating the initial material with large bulky masses therein, it serves to cool the fermenting product and avoid losses of nutrients therein without alteration of the structure of the apparatus.

A spray assembly cooperates with the flail assembly to apply moisture to the interior portions of the treated mass particularly the particles therein of small diameter and large surface area per unit volume.

The amenability of the machine for repeatedly processing manure in different stages of compost development produces a granular product substantially free of oder and, being relatively free-flowing, amenable to transportation and spreading by simple mechanical methods.

BRIEF DESCRIPTION OF THE DRAWINGS

Part 14D of FIG. 14 is a diagrammatic transverse vertical sectional and perspective view of the container portion of the apparatus of FIG. 13 as seen along the vertical transverse section indicated by plane 14A—14B—14C of FIG. 13 and part 14E of FIG. 14 is a diagrammatic showing of structures in Zone 14F of FIG. 13.

Tables I, II, and III hereof set out characteristics of samples of the material treated by the process of disclosed herein. Table IV provides dimensions of the apparatus 20.

DESCRIPTION OF THE PREFERRED EMBODIMENT

The apparatus 20 comprises, in operative combination, a rigid frame subassembly 21, a drum and flail subassembly 22, a drive and control subassembly 23 and a wheel assembly 30.

The apparatus 20 is arranged to move the central front opening 28 of drum and flail compartment 25 thereof over a mass of compost 50 and move the drum and flail assembly 22 through the mass 50 to mix it, flail it, and aerate it and, by action of sprayer assembly 27 to moisten the resultant mass while in a state of dispersion, and form the moistened mass by skirt members outlining a rear outlet opening 29.

Figures 1, 2, 11:
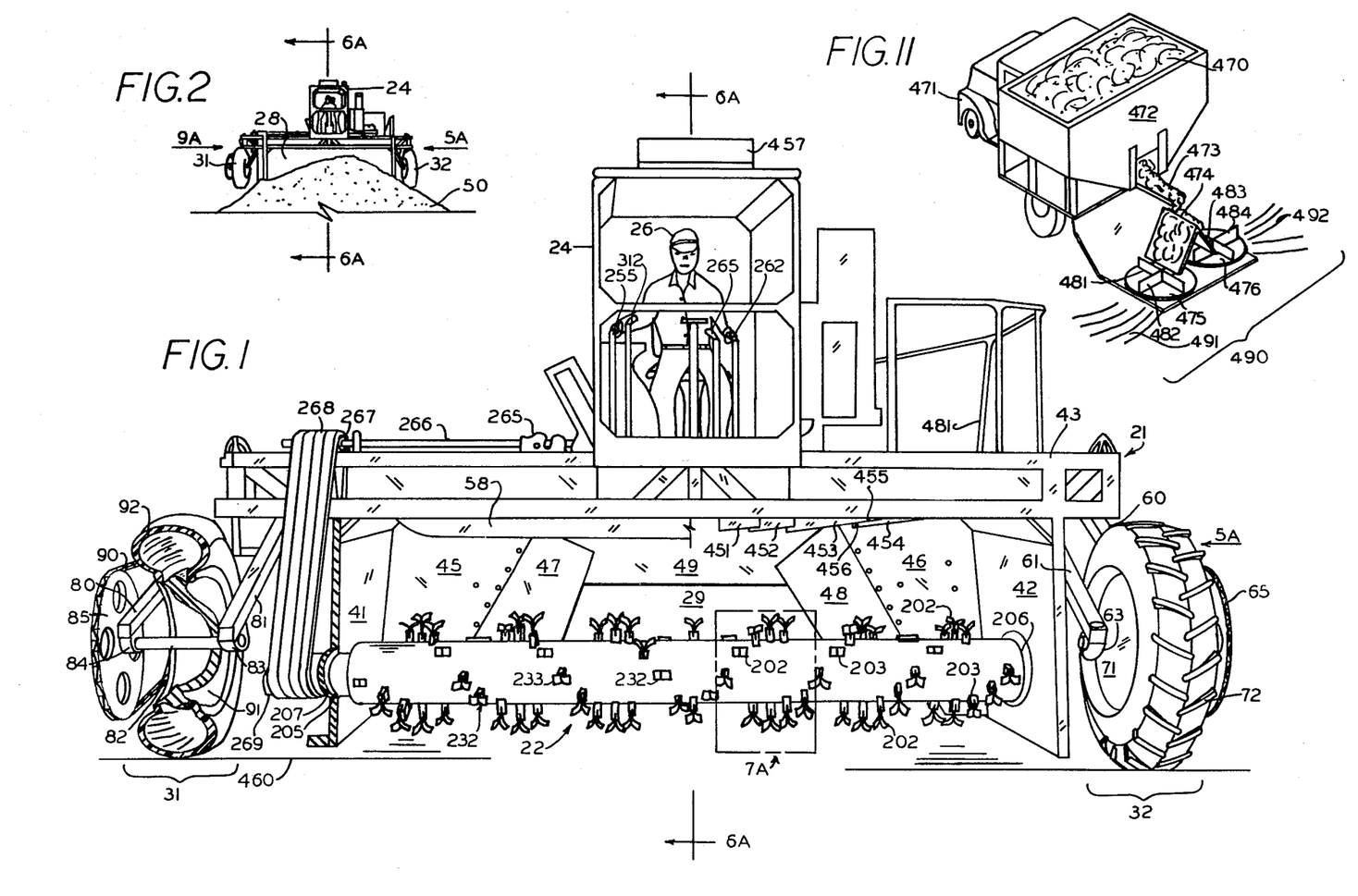
FIG. 1 is a front view of an apparatus 20 according to this invention when empty of feed thereto and shown broken away in part along section 1B—1B of FIG. 8 and with part of panel 58 removed.
FIG. 2 is a front view of the apparatus 20 in operation, as seen along the direction of arrow 2A in FIG. 6.
FIG. 11 is a diagrammatic perspective view of the process of distribution of the product of the treatment shown in FIG. 3.
Figure 4:
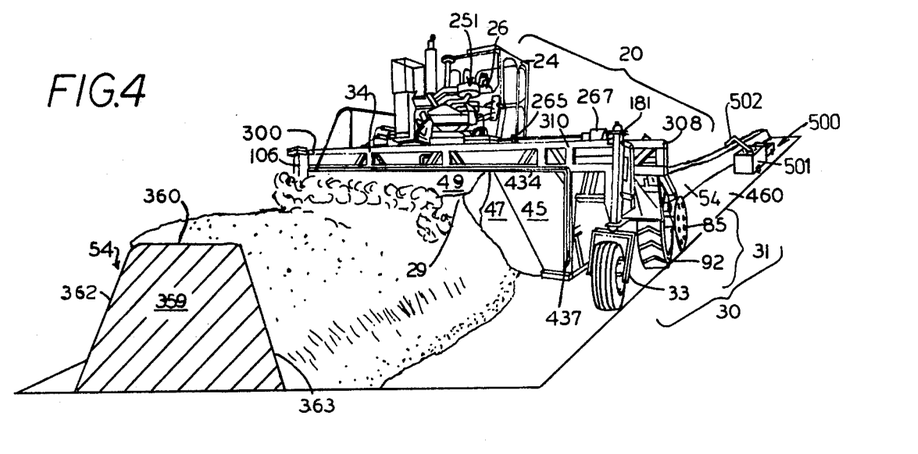
FIG. 4 shows an apparatus 20 according to this invention as seen in an oblique rear view along directon of arrow 4A of FIG. 3 while operating on a windrow or heap of compost 54.

Frame assembly 21 comprises, in operative combination, a rigid elevated horizontal frame 300 with a rigid vertical right wall, 42, and rigid vertical left wall 41 extending downward from the frame 300 and firmly attached to either side thereof, a rigid left rear wall 45, a rigid right rear wall 46, attached to left and right walls 41 and 42 and to frame 300 and extending centrally therefrom; an imperforate flexible left rear skirt 47 attached to right end of left rear wall 45 and rear of frame 300, a flexible right rear skirt 48 attached to left end of right rear wall 46 and rear end of frame 300, and a roof assembly 56 and a top central skirt 49. The roof assembly comprises a front imperforate roof panel 57, a downwardly and rearwardly directed spray shield panel 58, a sprayer assembly 27 and rear roof panel 59. The side walls are imperforate except for journals 205 and 206 for location of the drum and flail assembly. The central edges of the rear skirt portions 47 and 48 and the lower edge of the upper central skirt 49 define a trapezoidal rear opening 29 to drum and flail compartment or chamber 25. The front edges of walls 41 and 42 and the bottom of front edge of from 300 define a front opening 28 for the drum and flail chamber 25. The rear left and right walls 45 and 46 are rigid and extend vertically from frame 300 and are firmly attached at their front edges to the vertical rear edges of side walls 41 and 42, respectively, and to the bottom of frame 300 and extend rearwardly and centrally to join and support the central edge of the flexible left and right skirts 47 and 48, respectively, as shown in FIGS. 1 and 4. The top central skirt 49 is, like skirts 47 and 48, formed of flexible imperforate rubber belting. The top central skirt 49 is firmly attached at its top edge to the rear of frame 300. The bottom and rear edge 149 of the top central skirt 49 is horizontal and overlaps the rear edges of skirt members 47 and 48; the rear edges of the members 47 and 48 slope downwardly and laterally (as shown in FIG. 4 for member 47).

The spray shield panel 58 is a flexible yet tough and imperforate sheet of thick rubber belting that is firmly attached at its front edge to the bottom of frame 300 from left side wall 41 to right side wall 42 and is continuous with a horizontally extending front roof sheet or panel 57 of similar tough rubber sheet, as rubber belting, that is firmly fixed to the bottom of frame 300 from the front edge of member 301 thereof to the front edge of panel 58.

Another portion of imperforate roof sheeting, 59 extends from the front edge of panel 58 to the rear truss member 304 of frame 300 and is firmly attached to the bottom of frame 300.

Figure 8:
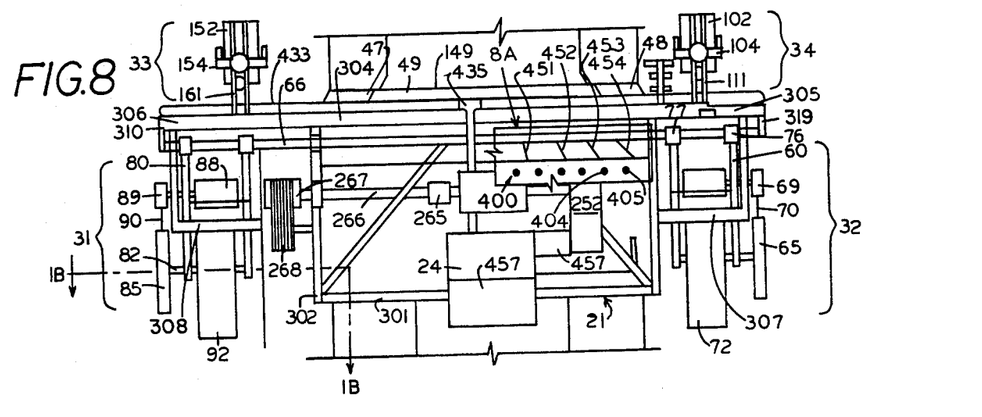
FIG. 8 is a diagrammatic top plan view of apparatus 20 broken away in part.
Figure 10:
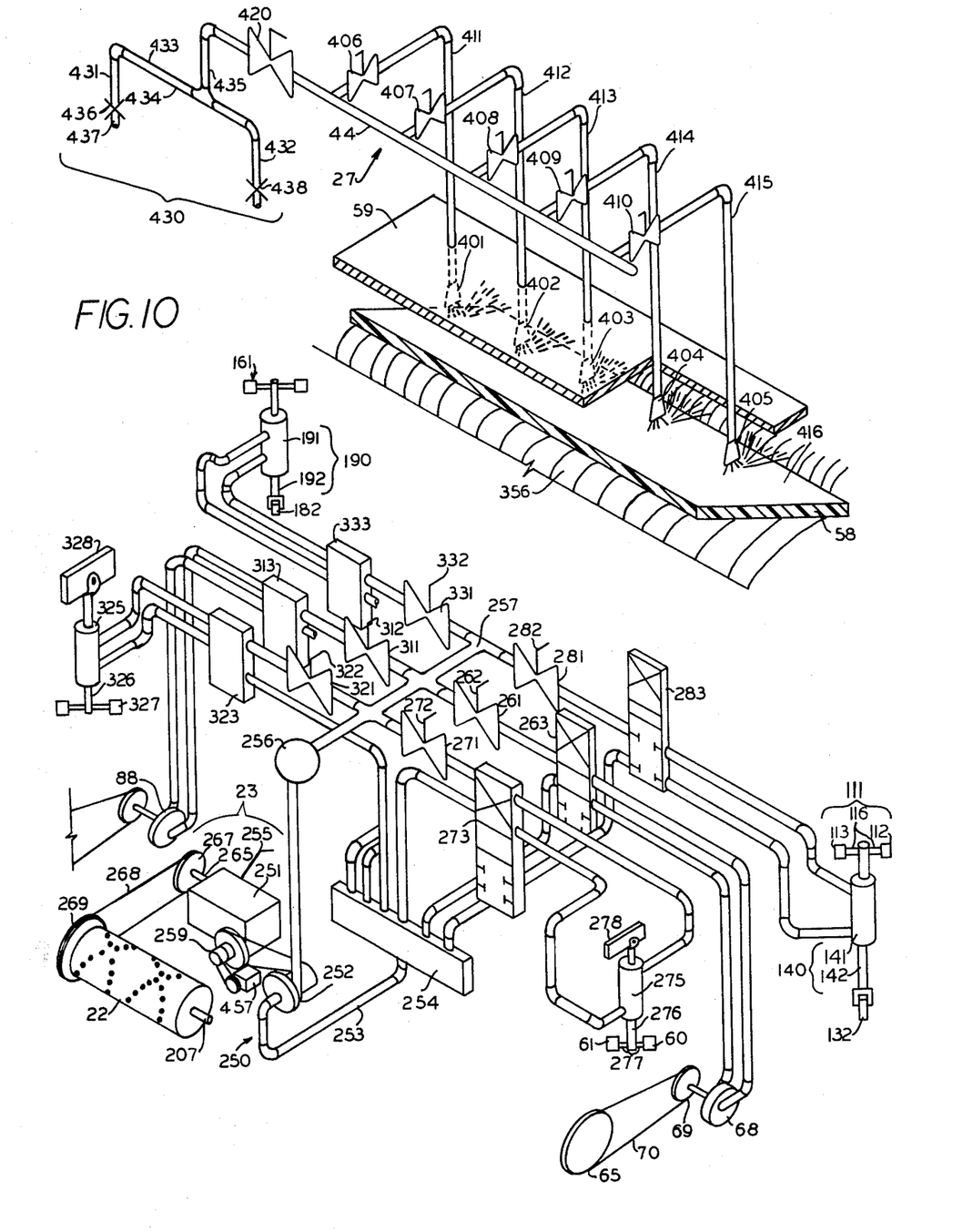
FIG. 10 is an isometric piping diagram of the operative connections of the hydraulically actuated units providing for the movement of the wheels of the apparatus 20 and for the adjustment of the height of the frame relative to the wheels and of the control of water flow into the material acted upon by the drum and flail assembly.

The bottom of frame 300 behind panel 58 provides support for a series of guide vanes, as 451–454 and for a series of water-spraying nozzles 400, of which 401–405 are shown in FIG. 10 and others diagrammatically shown in FIG. 8. The panel 58 protects the series of water-spraying nozzles, as 401–405 from contact by the dispersed particulate mass created by action of drum and flail assembly 22 on masses of compost recently formed, as 53 and 53.1 and masses in process of a series of treatments by the apparatus 20, as 54.

The skirt members 47 and 48 are held firmly at their lateral edges but are free to bend at their rear internal edges and rear of skirt member 49 overlaps the top of skirt members 48 and 47.

Horizontal frame 300 is a trussed rigid horizontal frame; it is composed of a trussed front horizontal truss member 301, a left longitudinally extending side horizontal truss member 302, a right horizontally extending horizontal side truss member 303 and a rigid rear horizontal transversely extending truss frame member 304, and a horizontal platform portion 309.

FIGS. 1, 4, 5, 7 and 9 are perspective views showing structures as seen by photograph but are, while not dimensionally to scale, illustrative of relations of size and position of the apparatus components and directed at illustrating three dimensional relations. The frame is made of rigid steel channels firmly joined together.

Other data on the apparatus 20 is given at Table IV hereof (Insert D).

Walls 41 and 42, 45 and 46 are made of rigid steel plate and have a horizontal bottom edge at the same level.

The horizontal frame platform portion 309 is a horizontally extending rigid trussed frame and is firmly joined to each of members 301–304 and the members 301–304 are firmly joined to each other at their corners. Members 301–309 are formed of rigid steel channels, as shown in FIGS. 1, 4, 5, 8 and 9. Frame platform portion 309 supports the roof structures and the cab 24 and the components of drive and control system 23.

A rigid rear right side cantilever extension 305 of the rear frame member 304 is firmly attached to and extends to the right of right side member 303 and a rigid rear left side cantilever extension member 306 is firmly attached to and extends to the left of the left side member 302. A horizontal rigid right central cantilever member 307 extends from and is attached rigidly to the right side of side member 303 near its middle and a horizontal rigid left central cantilever 308 is rigidly attached to and extends to the left side of left side member 302. An operator cab 24 is firmly attached to and seated on the top of frame 309 at front edge thereof near its center. A motor 251 (FIGS. 4, 9) also sits on top of the frame 309 at the rear of cab 24. A rigid shaft 66 is firmly fixed to the rear ends of side frame side members 302 and 303 and a right end plate 319 and left end plate 310 are firmly fixed to the end of the shaft 66 for support of shaft 66. The rear of each of wheel support arms as 60, 61, 80 and 81 are rotatably attached to shaft 66 as generally shown in FIG. 8.

A drum compartment 25 is enclosed within and between the left wall 41, right wall 42, rear wall portions 45, 46, 47 and 48 and opening 29 and front chamber opening 28 and below the roof assembly 56.

The wheel assembly 30 comprises a left front wheel assembly 31, a right front wheel assembly 32, a left rear wheel assembly 33 and a right rear wheel assembly 34.

The left front wheel assembly 31 and right front wheel assembly 32 are located to the left of the left side wall 41 and the right of the right side wall 42, respectively.

The left front wheel assembly 31 and right front wheel assembly 32 support the front of the frame 21 the left rear wheel assembly 33 and a right rear wheel assembly 34 support the rear end of the frame 21. The left and right front wheel assemblies 31 and 32 are mirror images of each other so that the description of one will apply to the components of the other and the left rear wheel assembly 33 and right rear wheel assembly 34 are also mirror images of each other so that the description of one will apply to the components of the other except that the structural components of assembly 31 are given referent numbers 20 units higher than the referent numbers of corresponding parts of subassembly 32 and hydraulic components referent numerals are 50 units higher for assembly 32 than for 31 (as for 34 and 33).

The right front wheel assembly 32 comprises, in operative combination, a rigid longitudinally extending lateral right front wheel support arm 60 and a rigid longitudinally extending right front central wheel support arm 61. The front ends of each of the arms 60 and 61 support a front right wheel axle 62 in journals 64 and 63, respectively. The interior right front wheel axle journal 63 is located at the front end of interior arm 61 and the exterior right front wheel journal 64 is located at the forward end of the right front lateral wheel support arm 60. A right front sprocket wheel 65 is firmly attached to the lateral end of the front right wheel axle 62. A rigid rear support shaft 66 is firmly attached to the side members of frame 300 and journals 76 and 77 thereon pivotally attach the shaft 66 to the rear end of each of arms 60 and 61, respectively.

A motor support plate 67 is firmly attached to the arms 60 and 61 midway between the front and rear ends thereof and supports thereon a hydraulic motor 68. An output shaft at the lateral end of the motor is firmly attached to a right wheel motor drive sprocket 69 which is attached by a drive chain 70 to the right front wheel sprocket 65. The right front wheel sprocket 65 is firmly attached to the right front wheel axle 62 and thereby to the rigid right front wheel 71. The right front wheel tire 72 is attached to the rim of the right front wheel 71 and serves to support the front end of the right side of the frame 300.

The right rear wheel assembly 34 comprises a right rear wheel 101 and a right rear tire 102, tire 102 mounted on the rim of the wheel 101. The wheel 101 is rotatably mounted on a rigid horizontally extending axle 103 and the axle 103 is supported on the parallel vertically and rearwardly extending arms of a fork 104. A rigid vertical guide shaft 105 is rigidly attached to the top of the fork 104 and is rotatably supported in a vertically extending cylindrical right guide shaft sleeve 106, coaxial with shaft 105. Sleeve 106 is mounted for vertical movement relative to the frame 300 by link pairs 111 and 121 and piston unit 140: such vertical motion is controlled by the piston unit 140 (shown in FIGS. 5 and 10) which is a part of the drive and control assembly 23.

A top right rear wheel link pair 111 comprises a rigid exterior top link 112 and a rigid right rear interior top link 113, each firmly pivotally joined to a rigid top right rear link pin 114 firmly fixed to right guide shaft sleeve 106 in operative combination.

Each member 112 and 113 of the top right rear wheel link pair 111 is pivotally joined at its front end to a front top link pin 115. A right top piston pin 116 firmly joins the middle of rigid links 112 and 113 and is firmly attached to such links and piston assembly 140.

A bottom right rear wheel link pair 121 is composed of an exterior bottom right link 122 and a right bottom internal link 123. Each member of the bottom link pair 121 is pivotally joined at its rear end to a rigid pin as 124 each firmly fixed to opposite sides of sleeve 106.

Figure 5:
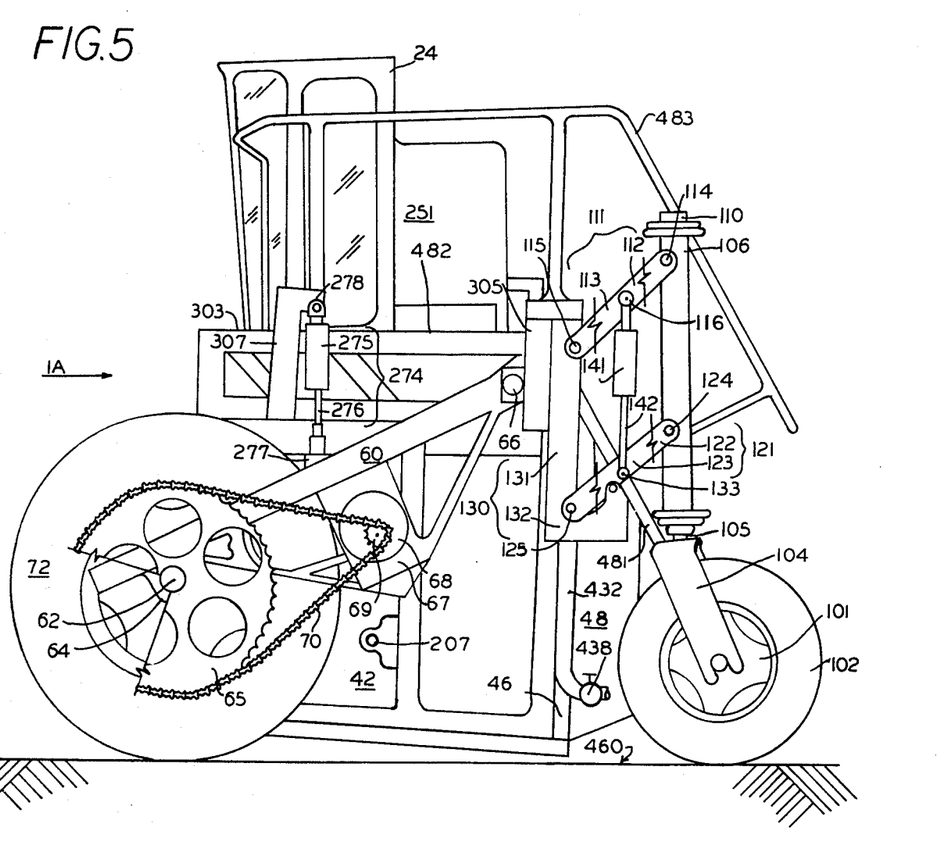
FIG. 5 is a side view of the right side of the apparatus 20 as seen along the direction of the arrow 5A of FIG. 2.

A rigid right rear wheel support base arm 130 has a forward vertical portion 131 that is formed of channel iron and extends vertically and parallel to the sleeve 106 and is attached firmly at its top portion to the frame 300 and so firmly held in vertical position, as shown in FIG. 5; base support 130 also has a horizontally and rearwardly extending rigid rear arm portion 132 at the upper rear end of which is supported a right rear wheel vertical piston support pin 133. Forward portion 131 is a rigid bar firmly fixed to the right rear end of the frame 300, as shown in FIGS. 5 and 8.

The front end of each of the bottom link pair members 122 and 123 is joined pivotally to and by a front pivot pin 125 to the rigid, vertically extending right rear wheel base vertical arm support portion 131. Pin 133 is firmly joined to arm portion 132.

A right rear wheel control piston unit 140 comprises a vertical piston cylinder sleeve 141 and a piston shaft 142 slidably movable therein and co-axial therewith. The top of the piston cylinder sleeve 141 is firmly yet pivotally fixed to the top piston pin 116 and the bottom of the piston shaft 142 is pivotally yet firmly fixed to the bottom piston pin 133 which pin is firmly located on the rear end of horizontal portion 132 of the right rear wheel base support arm 130. The central cylindrical longitudinal axis of the piston cylinder sleeve 141 and the piston shaft 142 is parallel to the central longitudinal axis of the guide shaft sleeve 106 and shaft 105 as well as the arm 131. The top rear right wheel link pair 111 and the bottom rear right wheel link pair 121 are also parallel to one another so that the links pairs 111 and 121 and the connections to the sleeve 106 and the arm 131 form a parallelogram and the position of the sleeve 106 relative to the arm 131 is controlled by the expansion and contraction of the control piston unit 140. Corresponding parts of the left rear wheel assembly 33 are indicated by reference numerals 50 units higher than the corresponding parts of the right rear wheel assembly 34. Otherwise, the right rear wheel assembly 33 is a mirror image of the left rear wheel assembly 34 and the front right wheel assembly 32 is a mirror image of the left front wheel assembly 31.

Figure 7:
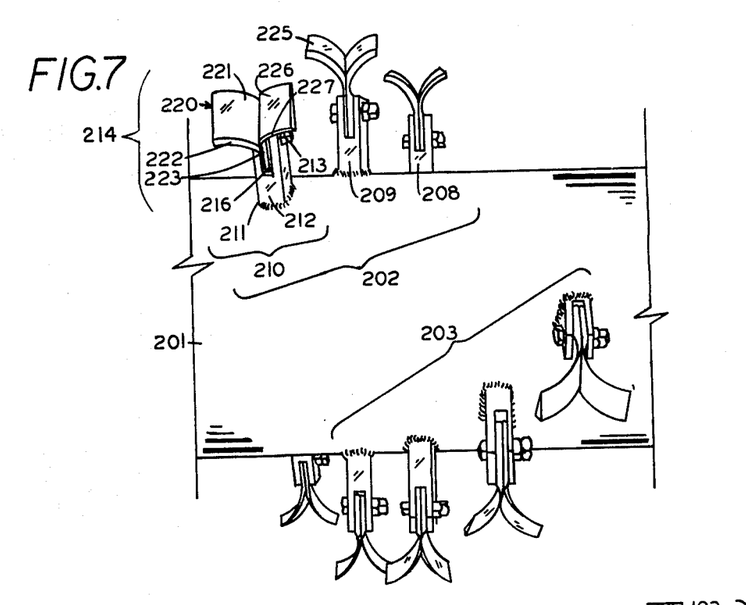
FIG. 7 is an enlarged view of the flails and drum in zone 7A of FIG. 1.

The drum and flail assembly 22 comprise a rigid horizontally extending cylindrical drum 201 on which a plurality of helical arrays 202, 203, 232, 233 of like flails are operatively connected. Each flail as 208, 209 and 210 is alike so that a description of one flail, 210, of one array (202), applies to the other flails of the other arrays. Each flail, as 210, (shown in FIG. 7) comprises a radially extending rigid straight rectangular sectional left base column 211 and a like right base column 212 parallel thereto, each fixed firmly at its central portion to the outer surface of the drum 201. A rigid flail pin 213 extending parallel to the axis of drum 201 as shown in FIG. 7 is firmly attached to the radial portion of base columns 211 and 212 and extends across a space therebetween, 216. The T-shaped blade 214 of each flail as 210 comprises a horizontally extending flat left blade portion 220 and a horizontally extending right blade portion 225 and a center arm 223. The flail blade portions 220 and 225 extend parallel to the length of the drum 201. The center arm 223 extends transversely to the central longitudinal axis of the drum. Each blade as 214 is pivotally attached to the pin and thereby to the base columns 211 and 212.

Each blade portion, as 220, has a sharp-edged front cutting edge 221 and a rear thicker rear edge as 222 and is firmly joined to radial end of center arm 223. The blade 214 also has a right portion 225 that is a mirror image of portion 220; portion 225 has a front cutting edge 226 like 221, a rear edge 227 like 222, and is firmly attached to center portion 223. The pin 213 extends parallel to the longitudinal axis of the drum 201 through the central end of center portion 223 of the blade 214 to form a pivotal flail unit support, as shown in FIG. 7.

As viewed moving from right to left, as shown in FIGS. 1 and 7, on the right side of drum 201, one helical group 202 of such flail units extends from the righthand side thereof in a clockwise direction around the drum 201 to the center plane (6A—6A) of the drum 201 from the right hand end of the drum 201, with uniform spacing between the flails of the series and another group of flail units as 203 extends between the portions of the helix formed by the group of such blades generally as shown in FIG. 1.

As shown in FIG. 1, the helical arrays 202 and 203 each have the same helix shape (as measured by pitch or slope) and same spacing of the flails in the series and are arranged to be 180° apart from each other.

The right hand side and the left hand side of the overall drum and flail assembly 22 are mirror symmetrical about the vertical central longitudinal plane (section 6A—6A of FIG. 1) whereby the clockwise series of flails 202 which extend from the right hand end of the drum, as shown in FIG. 1, to the center thereof is continuous with a mirror symmetrical series of flails 232 on the left hand side of drum 201 and the series of flails 203 is continuous with a mirror symmetrical group of flails 233 on the left hand side of the drum 201, generally shown in FIG. 1, whereby the sideways action of the flails balances and the reaction resulting from the action of such flails on the mass of windrows as 51-54 met thereby during the operation of the apparatus 20 also balances.

The drum 201 comprises a rigid hollow sturdy cylindrical shell 204 mounted on a rigid axle 207. Axle 207 is rotatably supported in left journal 205 and right journal 206 at its left and right ends, respectively, in walls 41 and 42, respectively. The left end of the axle 207 extends through journal 205 and is there firmly attached to a drive pulley 269. Drive pulley 269 is connected to a set of drive belts 268. Spiders as 200 connect the drum axle 207 to the shell 204 of the drum 201 (see FIG. 6).

The drive and control assembly 23 provides for controllably driving the front wheels 31 and 32 of the wheel subassembly 30 and provides for controllably driving the drum and flail assembly 22 and for controllably applying water to the material treated during the operation of the apparatus 20. The components of the drive and control subassembly 23 are in part supported on various parts of the frame 21 and are operatively connected to the drum and flail subassembly 22 and to the wheel subassemblies 31, 32, 33 and 34 and spray assembly 27 as diagrammatically shown in FIG. 10, as the hydraulic connector lines between the pistons and hydraulic motors actuated by the hydraulic pump 252 are not illustrated for purposes of clarity in the other figures, such lines being conventional.

The drive and control assembly 23 comprises, in operative combination, an internal combustion engine motor 251, a hydraulic pump system, 250, front wheel drive motors 68 and 88, front wheel position control piston units 274 and 294, and rear wheel position control piston units 140 and 190.

The throttle 255 of motor 251 is under control of operator 26. The motor output pulley 259 is operatively connected as by a conventional clutch and belt to the hydraulic pump 252; an inlet line 253 of the pump 252 is operatively connected to the discharge of a hydraulic sump 254.

The pump 252 discharges to a pressure tank 256 which feeds to a high pressure manifold line or tank 257.

Each front wheel motor, as 68 and 88, is connected by lines and driven by hydraulic fluid passed therethrough through a control valve as right front wheel motor valve 261, the control handle of which, 262, is located in the cab 24. The outlet of the right drive wheel motor control valve 261 is connected through a hydraulic control valve 263, diagrammatically shown in FIG. 9, to the inlet of the motor 68; motor 68 is arranged for operation in forward or reverse direction, dependent on the switching positioning of the conventional switch control valve 263.

Figure 9:
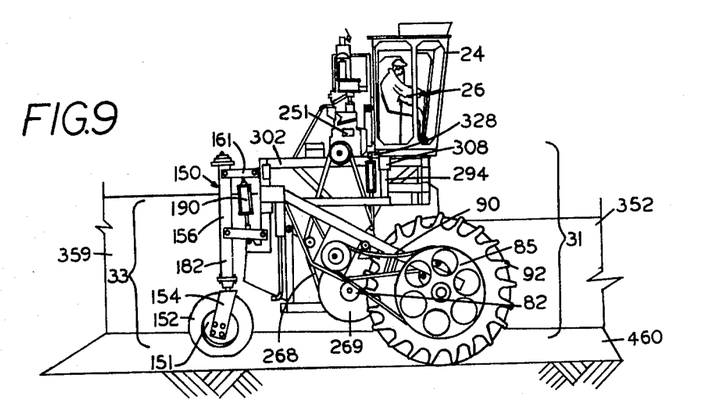
FIG. 9 is a side view of left side of apparatus 20 along direction of arrow 9A of FIG. 2.

The hydraulic control valves 273, 283 and 263 are each hydraulic switch control valves, the cores of which are shown diagrammatically for purposes of illustration in FIG. 9 in each of three different positions; the core of valve 273 is shown in its reverse position. The core of valve 263 is shown in the direct flow position and the core of valve 283 is shown in its blocking position; in valve 263, the high pressure line is connected to the topmost of the hydraulic lines; for valve 273, the high pressure line is connected to the bottom flow line to drive the lowered piston 276 upward, while in valve 283, the valve core of such switch is shown in a blocking position whereat the piston cylinder 141 is held in fixed relationship relative to the otherwise movable piston shaft 142. All these controls are movable as needed.

Accordingly, by manipulation of the valve control arm 262 of valve 261, the operator 26 in cab 24 may apply more or less pressurized hydraulic fluid to motor 68 and drive the sprocket 69 attached thereto, and, thereby the front wheel drive chain 70 and front wheel 71 attached thereto for control of rotational speed of wheel 71; manipulation of valve 263 provides for control of direction of rotation of front right wheel 71. The front right wheel is raised and lowered relative to frame 21 by pivoting arms 60 and 61 on the axle or support shaft 66 by controlling the action of the front right hydraulic cylinder assembly 274. Hydraulic piston assembly 274 comprises a vertically extending right piston cylinder sleeve 275 and an co-axial extensible piston shaft 276. The lower end of piston shaft 276 is pivotally connected to a rigid cross arm 277 which is firmly fixed to the lateral right front wheel support arm 60 at the lateral end of cross arm 277 and is firmly fixed to the interior right front wheel support arm 61 at the interior end of the cross arm 277 (as in FIG. 10). The cylinder sleeve 275 is firmly fixed at its upper end to the rear end of a rigid piston cantilever arm 278; arm 278 is firmly attached at its front end to rigid right central cantilever arm 307.

A control valve 271 for the right front wheel elevation assembly control cylinder 274 feeds into a right front wheel hydraulic switch valve 273 (the same in structure as the valve 263) whereby to control the operation of raising and/or lowering of the right wheel assembly 31. A control arm 272 for the valve 271 is located in the cab 24.

A right rear wheel assembly control valve 281 is fed hydraulic fluid under pressure from manifold 257 and controllably supplies such hydraulic fluid to hydraulic switch 283 which feeds to the right rear wheel control cylinder 141 to raise or lower the piston shaft 142 therein. A control arm 282 for the valve 281 as well as for the switches 263, 273 and 283 are located in the cab 24.

A left front wheel motor control valve 311 feeds to a left front wheel hydraulic switch 313 like 263 and thereby powers the left wheel motor 88, as above described for motor 68; the valve 311 is identical in construction to 261 while the hydraulic switch 313 is identical in construction to the switch 263 and a control arm 312 for the valve 311 is operatively connected thereto and located in the cab 24 for control by the operator 26.

Similar to the above described operation for the right front wheel, a left front wheel elevation control valve 321 (identical to valve 271) is operatively connected to the manifold 257 as is valve 311 and is provided with a valve control arm 322 in the control cab 24; the outlet of the valve 321 is operatively connected to a left front wheel elevational hydraulic switch 323 identical to switch 273 and independently operable from the cab 24 and operatively connected to a left front wheel elevational control piston cylinder 325 provided with a shaft 326 connected to a cross arm 327 which cross arm is operatively connected to left front wheel support arms 80 and 81 for movement of the left front wheel relative to the frame 21. The upper end of the piston 325 is firmly attached to the cantilever arm 328 which, in turn, is fixedly attached to the left middle cantilever arm 308.

A left rear wheel elevational hydraulic control valve 331 like valve 281, is operatively connected at its inlet to the manifold line 257 and controlled by an arm 332 in control cab 24 and feeds to a left rear wheel elevation control hydraulic switch element 333 identical in structure to the hydraulic switch 283. Hydraulic fluid is connected from the manifold 257 through the left rear wheel elevation control valve 331 and the left rear wheel elevation switch 333 to the piston sleeve 191 for the left rear wheel assembly 150 to move the piston shaft 192 within such cylinder 191 up and down and thereby to adjust the elevational position of the left rear wheel 151.

The control arms 312, 322 and 332 of valves 311, 321 and 331, as well as the controls for the hydraulic switches 313, 323 and 333 are located in the cab 24.

Motor 251 is also operatively connected through a drive chain comprising, in operative combination, a clutch 265 and drive shaft 266, a drive pulley 267 firmly fixed to shaft 266, and a set of drive pulley belts 268 operatively connecting the pulley 267 to a driven pulley 269 attached to the drum 201, to drum 201.

Axle 207 of the drum 201 is located below and slightly forward (14") of the line of nozzles as 401-405 thereabove of the spray assembly 27.

A series of 29 like vertically downwardly directed and parallel water spraying nozzles, as 401-405 extend horizontally from the left side wall 41 to the right side wall 42 in a straight line with the downwardly directed nozzles of the series equally spaced along the length of the linear series. The nozzle openings are located between the bottom of the roof panel 59 and the top of the spray panel 58 and vertically above and directed vertically toward the sloped top surface of the panel in order to produce a uniformly distributed spray of water 230 rearwardly of the rear edge 416 of panel 58. Each of the nozzles has a separate control valve, as 406-410, respectively, with lines 411-415 therebetween, respectively, and a master valve 420 controlling the line 44 feeding all of nozzles, as 401 to 405 and located in the cab 24. A feed line 430 is connected to line 44 and comprises a left vertical line 431 and a right vertical line 432 and a T-shaped conduit 433 comprising a rear transverse horizontal line 434 fixed to rear frame member 303 and a longitudinally extending central line 435 connected thereto; line 435 feeds into the main spray line 44 via valve 420.

Left vertical feed line 431 is firmly fixed to exterior left rear vertical edge of left side wall 41 and has a quick connect coupling 437 with a check valve 436 at the lower end thereof for connection to a source of water; also, right vertical feed line 432 is firmly fixed to exterior of right rear vertical edge of right side wall 42 and has a right quick disconnect coupling 438 and check valve for connection to a source of water.

In operation of apparatus 20 the line 435 is connected either by coupling 437 or 438 to a source of water, as a well 440, as by a long flexible fire hose 442. Thereby the spray assembly 27 is maintained in operative connection with a source of water during operation of apparatus 20 on masses as 51–54.

In operation, a compost starter inoculant as B-D [a mark of Pfeiffer Foundation, Inc. of Spring Valley, New York] is mixed in proportion of 50 ounces of powdered innoculant per each 50 tons of manure to be treated: each 50 ounces of innoculant is mixed with 32 ounces of water, then the resultant slurry is mixed with 50 gallons of water; the resultant liquor is applied to the pile, as 54, to be handled by apparatus 20 after the mass has been brought to 30 percent moisture.

Figure 6:
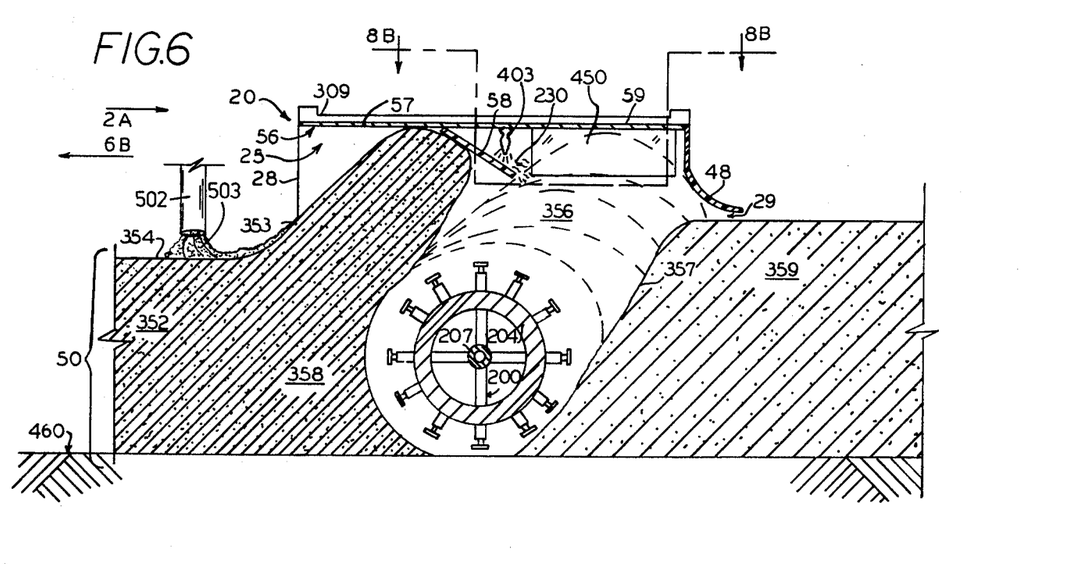
FIG. 6 is a diagrammatic vertical longitudinal section at plane 6A-6A of FIG. 1 of an operating apparatus 20 below frame platform portion 309.

FIG. 8 is broken away at zone 8A in FIG. 8 at level of plane 8B-8B of FIG. 6 to illustrate the operation of the vanes, as vanes 451, 452, 453 and 454; a vane 450 corresponding to vane 451 is shown in FIG. 6.

In FIG. 1, the right hand portion of the panel 58 is shown as removed to expose the position of the vanes 451, 452, 453, and 454 and the water nozzles of assembly 27 are not shown. The vanes are located on both sides of the central longitudinal vertical plane 6A—6A of the drum chamber or compartment 25 in mirror symmetrical fashion. The vanes are each rigid imperforate flat plates or may be rigid rubber panels or rubber coated flat metal plates that extend vertically downwards from the rear roof panel 59 of the chamber 25 and are firmly attached thereto and to frame 300. These vanes direct the flow of the airborne stream of fine particles formed by the drum and flail assembly 22 when such stream is at the location shown by referent numeral 356 in FIG. 6.

These vanes, as 451-4, on one side and like vanes on the other side are located behind the rear or lower edge of the spray panel 58 and extend diagonally rearwardly and centrally, i.e., rearwardly and to right on left side of frame 21 and rearwardly and to left on the right side of frame 21. The vanes are at an angle of 60° to the direction of movement of apparatus 20 adjacent to the side walls 41 and 42 and 30° to the direction of movement of apparatus 20 at the most central of the vanes in front of the rear opening 29 with varied angles of the vanes between central and lateral extremes to provide a gradually increasing change of direction of the path of material therepast. The front end of the central vane of each pair of vanes in the series of vanes, as lateral edge 455 of vane 453, extends laterally toward the side wall 42 to reach a lateral position which is less than the distance from that (closest) side wall of the rear and central edge 456 of the vane (454) laterally adjacent thereto as shown in FIG. 1: thereby all smallest sized portions of the stream of particles 356 acted upon by the flail and drum assembly 22 are intercepted by some portion of the vane assembly as well as by the spray 230 while such finer particles derived from action of the drum and flail assembly on mass 352 are in an airborne condition wherein such particles are sufficiently separated to rapidly absorb water from spray 230. Thus the set of vanes prevents the smallest particles derived from action of drum and flail assembly 22 on mass 352 from being merely thrown rearwardly out of the rear orifice 29; the set of vanes provides not only for aerating but also provides particularly for mixing the finer particles with the spray of water in the portion of chamber 25 immediately to the rear of the spray panel 58 and guiding such mixed, aerated and moistened finer particles to the center and top of discharge orifice 29 where they form a moist covering for the pile 359 of generally truncated triangular cross section. The vibration of the flexible panel 58 resulting from the impact of material applied against the bottom thereof by the drum and flail assembly assists in evenly dispersing the water applied against the top of panel 58 into the dispersed and agitated mass of particles at zone shown as 356 in FIG. 6 above and to rear of the drum and flail assembly 22 and below and to rear of spray panel 58.

Apparatus 20 provides the steps of selectively reducing the size of larger particles or agglomerates in the initial feed, and, during subsequent repeated treatment of the resulting flailed mass, selectively applying moisture to the finer particles of such masses while producing thorough mixing of the particles of intermediate sizes and rapidly producing a flowable granular product readily dispensed. This process thus rapidly provides a useful agricultural product while removing undesirable cow manure from locations where its presence is undesirable.

The amenability of apparatus 20 for repeatedly processing manure in different stages of compost development produces a granular product substantially free of odor and, being relatively free-flowing, amenable to transportation and spreading by simple mechanical methods.

The manure to be treated by machine 20 is loaded by front end loaders from feedlot pens and transported by large, e.g. 20 cu. yd., trucks as 461 to a site of flat land, as 460, and there dumped into piles, as 51, 52, 52.1, 53, 53.1 and 54, each 300 to 400 yards long (diagrammatically shown in FIG. 3) and, as diagrammatically shown in FIGS. 2 and 4, trapezoidal in transverse cross-section.

The masses of manure are usually deposited in sequential series with the mass first deposited illustrated as 51 in FIG. 3, and the masses subsequently deposited arrayed sequentially as shown as 52 and 52.1, 54 and 53 and 53.1 in FIG. 3 with the most recent deposit . . . transferred from the feedlot by truck 461 . . . being the mass added to the windrow 53.1. These piles are 10 feet wide at their base and about 3 feet 6 inches high with sides at an angle of repose of 35° to 45° and a slightly curved but relatively flat top with rounded corners.

After location on the site 460 water is added to the top of the pile of fresh manure by a fire hose at rate of 65-70 g.p.m. until water is observed to come out of the bottom portion of the sides of the mass. A goal of 30 percent moisture is attempted to be reached prior to adding innoculant. Innoculant, prepared as above described, is added by spraying from a truck to the top of the pile, as 53.1.

A rough test of the moisture in the mass is by firmly squeezing a mass thereof (of about 300 grams) in the hand for one to two seconds and releasing the pressure on the theretofore squeezed mass; if the mass rapidly disrupts it has less than 25 percent by weight moisture; if it barely stays together it has 30 percent moisture; if it remains as a coherent ball it has in excess of 35 percent by weight moisture. Generally the mass treated is kept at 25-30 percent (by weight) moisture by the initial addition of water and the spraying concomitant with subsequent mechanical treatment by apparatus 20.

In operation the apparatus 20 is arrayed so that the left and right wheel assemblies 31 and 32, as well as 33 and 34, straddle the windrow 54 which is to be treated thereby. Mechanical power is applied through the motor 251 to drive the left and right front wheel motors 68 and 88 and cause the apparatus 20 to move forward into the mass as 352 in a direction 6B (shown in FIGS. 3 and 6). The direction of motion of the apparatus in its operative condition is shown by the arrow 6B.

During such motion the drum and flail assembly 22 is driven — by the drive train comprising the motor 251, clutch 265, shaft 266, pulleys 267 and 269 and belt group 268 under control of operator 26 in cab 24 by use of motor throttle 255 and clutch 265 — in a clockwise direction (clockwise as shown in FIG. 6) at about 600 r.p.m. This relation of the drum and flail assembly produces an upward motion of the flails against the portion of the mass as 352 into which the apparatus 20 is advanced. The flails continuously (a) raise and disperse all particles of mass they meet, and (b) selectively disrupt the larger aggregates of the mass, and (c) cause a dispersion of the resulting dispersed mass of particles from portion 352 of the mass 54 into which the drum and flail assembly advances, and (d) raises fluidized portion 353 (developed above the top level as 354 of the mass 352) to extend up to the roof 56 overlying the chamber 25 of the apparatus 20; a forwardly cataracting mass of granules is thereby produced in zone indicated as 353 of FIG. 6 and such cataracting aerates as well as mixes the material raised from the lower portion, as 358, of mass 352.

Each windrow or elongated mass as 54 is acted upon each 3 or 4 days by apparatus 20 to be mixed and aerated and moistened as above described. This treatment serves to maintain the maximum temperature within each mass as 54 below 160° F.. After about ten treatments to maintain moisture content at 25-30 percent and agitation and mixing of the mass as 54 as above described by apparatus 20 the temperature of the mass 54 stays at approximately 80° F. and treatment by apparatus 20 then ceases. The product is granular and flows like loose sand (its size analysis is given in Tables I and II and FIG. 12).

TABLE I is a cumulative size analysis as weight percentages of (a) a sample of manure as initially provided for treatment by apparatus 20;

(b) a sample of manure after several stages of treatment by process of this invention using apparatus 20;

(c) a sample of manure after one additional stage of treatment beyond the stage of sample (b) by apparatus 20;

(d) a sample of final product of treatment by apparatus 20.

The size analysis of the feed, as shown at sample 1 in Table I hereof, shows the size analysis of the material initially placed in the piles 51-54, and many of the lumps in the feed are of size as large as a man's head as initially placed in the piles 51-54. Samples 2 and 3 are size analyses of Table I in a mass as 352 during an intermediate stage in the composting operation. Sample 3 of Tables I and II is a sample of size distribution of aggregates in a mass as 359, which sample was taken from the mass left behind the apparatus 20 as it moved forward (in a direction shown as 6B in FIG. 6). As there shown, by comparison of samples 2, 3 and 4, the apparatus 20 does not significantly change the size distribution of the material treated or increase the −40 mesh size from feed to intermediate stage to discharge therefrom to final product; such data shows that the apparatus 20 serves well as a mixing and aerating and, as provided by vane action near the spray assembly 27, a selective applicator of moisture to the finer sized agglomerates.

As shown by the comparison of the size analyses of the feed (item 1) and final product (item 4) of Tables I and II by the operation by apparatus 20, apparatus 20 substantially completely destroys aggregates over one-half inch in size.

The direction of movement of apparatus 20 is controlled by providing different speeds for each of the wheels 72 and 92 (of wheel assemblies 32 and 31, respectively) by varying the speed of the motors 68 and 88 for such wheels. The rear wheels as 102 and 152 trail rather than steer the apparatus 20; the axles as 105 of each wheel as 102 in rear wheel assemblies 33 and 34 rotate in the support therefor, as sleeve 106. Thereby the operation of the machine 20 may change the direction of motion of wheels 31 and 32 relative to position of wheel assemblies 33 and 34 as shown at 465 for change of direction of the apparatus 20 from a path of movement in which one windrow (as 54) is treated as shown in FIGS. 3 and 4 to a path whereat the next windrow, as 52.1, is treated by the apparatus 20 as above described for the treatment by apparatus 20 of the window 54.

Also, the drive arrangement of apparatus 20 provides that the axles 62 and 82 of the wheel units 31 and 32 are (as shown in FIGS. 5, 8 and 9) well in front of the axle 207 of the drum and flail assembly.

The separately controlled drive provided by assembly 23 to each of wheels 71 and 91 provides for accomodating the torque applied to each wheel so as to keep both sides of the apparatus 20 moving at an even rate of speed into and over the masses as 51–54, notwithstanding usual variation in height and consistency of such masses along transverse cross-section thereof and at different positions measured across the length of drum assembly 22 of apparatus 20, as well as to accomodate variations in the longitudinal shape of masses as 51–54.

The height of the center of axle 207 over the bottom of walls 41 and 42 is, in the preferred embodiment, 16 inches, which height is chosen so that the bottom level of the blades, as 210, during their operation, will reach the same lower level as the bottom of the walls 41 and 42 and as all of the blades are of the same size and length from the drum 201, they will all reach the same bottom level. The level of action of the blades as 210 is controlled by control of the action of the cylinders which raise the wheels, such as the piston units 274 and 294 for the front wheels and 190 and 140 for the rear wheels of the apparatus 20.

Because the apparatus 20 provides as above described, a relatively selective reduction in size of the larger size materials in the manure mass initially deposited as by truck 461 at windrow 53.1 and it (20) does not substantially reduce the size of particles of the intermediate sizes as ⅛ to 1/20 inch apparatus 20 may be used, after treating the freshly deposited material as at windrow 54 (with analysis at sample 1 of Table I) to move on to treatment of other masses, as 52.1 and 52, which masses of material have theretofore undergone several stages of mechanical treatment by the apparatus 20 and a longer period of subjection to biochemical fermentation action without change of adjustment of the mechanism of the apparatus 20, because the apparatus 20 serves to mix and aerate such material in intermediate stage of treatment without substantially changing the distribution of size of particles in the mass, i.e. the apparatus 20 performs a mixing and aerating and moistening operation rather than a grinding action on −¼ inch material.

After 10 steps of treatment of each windrow mass 54 by apparatus 20 as above described, at intervals of 3 to 4 days between new treatments, the sticky, smelly obnoxious cow manure is made into a granular free-flowing substantially odorless readily transported and applied useful soil conditioner and fertilizer 470 containing 2 to 3% nitrogen because the high moisture content needed for rapid bacterial action on the manure is effected because the apparatus 20 reliably, rapidly and effectively agitates and mixes, cools and aerates such material while evenly and effectively adding moisture thereto.

Because of the relative looseness of the top skirt 49 against the top of the pile 359 left behind apparatus 20 as apparatus 20 advances through a windrow pile as 54 (as shown in FIG. 6) and the relative firmness of contact of the central edges of skirt members 47 and 48 with that pile 359, the skirt members form the pile 359 into a trapezoidal mass 359 of same width (10 feet) but about 20% higher than the untreated mass 352 with a relatively flat top 360 onto which the small or finer sized particles from zone 356 settle. The distribution of the finer particles of the mass 352 by assembly 22 action to the top of chamber 25 behind the panel 58 produces a layer of such finely divided moistened particles on the flattened top of the agitated mass as 359 produced by apparatus 20; such fine particles are initially located at the top of mass 359 immediately to the rear of skirt 49 as apparatus 20 moves forward. A large but minor portion thereof rolls or slides down the side of the mass 359 (as at sides 362 and 363 at FIG. 4) and form a thin crust on the top and side of the mass 359 that inhibits loss of moisture from the interior of the mass 359 between step of treatment by apparatus 20 although such crust forms cracks as it dries and then permits access of air to the interior of the granular mass whereby moisture as well as air is available for rapid action of bacteria on the components of the manure. By maintaining the mass as 352 cool — by turning every 3–4 days by apparatus 20 — and moist and aerated, the bacterial action due to initial bacteria in the manure produced by feedlot fed cattle, which are usually fed high protein feed — as well as inoculant — provide such reduced destruction of the nitrogen components that the bacterial decomposition is primarily due to destruction of the cellulosic components of the manure, with the protein components well preserved as shown by that there is no substantial change in the C/N rate from raw feed, as at pile 53.1, and final product at 470, although there is a shrinkage in weight of the manure of about 25% (over a period of 60 days using this process) from such raw feed to final product.

The finished product, 470 as from windrow 51, is loaded by a front end loader 458 into a transport truck 459 and carried away therein from site 460.

The granular characteristics of the product are utilized in the application of such product to the soil intended to be treated thereby. A truck 471 with a load compartment 472 carries a load 470 of the product over a field 490 to be treated therewith. A 36 inch wide conveyor belt 473 passes the granular product 470 over a splitter 474 (splitter 474 has an inverted "V" section) which is 18 inches long at its top, and 10 inches wide at its bottom edges, onto each of two counterrotating 24 inch diameter rigid circular disperser plates 475 and 476; plate 475 rotates clockwise at 600 r.p.m. as seen from above and plate 476 rotates counter-clockwise at 600 r.p.m.; plate 475 has a pair of transversely crossed two inch high vertical extending flat rigid plates 481 and 482 fixed thereon and plate 476 has a similar pair of transversely crossed vertically extending two inch high flat rigid plates 483 and 484. The splitter passes the product 470 onto the rear outer portion of plates 475 and 476 and the plates spray the granular product over a 12 foot wide swathes 491 and 492 on each side of the truck while the truck travels at 5-7 m.p.h. to apply from ½ to 2 tons product of product 470 per acre.

A power take-off on truck 471 drives the plates 475 and 476 and conveyor 473.

The data for the moisture test of Table III are the result of difference in sample weight after heating a weighed sample at 148° C. for 20 minutes.

The 6 mesh, 14 mesh, 20 mesh and 40 mesh screens of Tables I and II are A.S.T.M. screens and have apertures of 1.132 (⅛ inch); 0.055 inch (1/18 inch); 0.033 (1/30 inch) and 0.0165 inch (1/60 inch) respectively.

Samples 2, 3 and 4 of Tables I, II and III were each taken from a windrow as 54 at a depth of 3 feet from top and 2 feet from bottom of lateral edge and 1 foot in from lateral surface; the source of sample 2 was a windrow that had been inoculated and turned six times: sample 3 was taken immediately after the windrow from which sample 2 was taken was treated by apparatus 20.

The operation shown in FIGS. 1-11 and above described take place while the material and apparatus above described are exposed to the usual atmosphere of air and sunlight.

TABLE I is a cumulative size analysis as weight percentages of samples of the material treated at different stages in its processing.

TABLE II presents the data of Table I as a percentage weight of each total sample in each of several size ranges.

TABLE III is a moisture analysis of the samples (a), (b), (c) and (d) of Table II.

TABLE IV provides dimensions of an apparatus 20. Right and left refer to right and left as shown in FIGS. 1 and 8; front is left as shown in FIGS. 5 and 6.

Operatively adequate approximate dimensions may be measured off in FIGS. 1, 4, and 5 and 9 from data of Table IV.

TABLE I is Insert A hereto.
TABLE II is Insert B hereto.
TABLE III is Insert C hereto.
TABLE IV is Insert D hereto.

Figure 3:
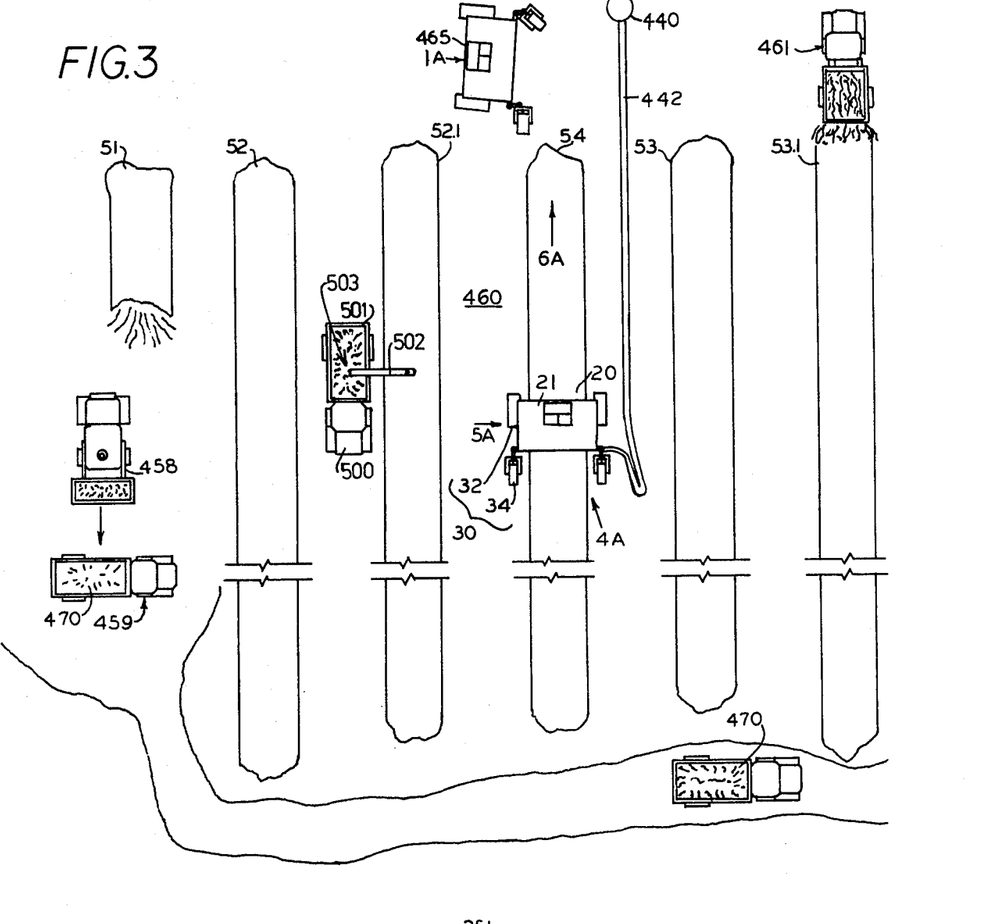
FIG. 3 is a diagrammatic plan view of a system of manure compost according to this invention showing compost heaps 51, 52, 52.1, 53, 53.1 and 54 and an apparatus 20 according to this invention.

A grain truck 500 with container 501 and an auger 502 precedes the apparatus 20 in the travel of the apparatus 20 over the piles as 51, 52, 52.1, 53, 53.1 and 54 as shown in FIG. 3 and above described in regard thereto. Container 501 carries granular or other finely divided supplement 503 and, in the operation of the truck 500 such truck while moving a head of the apparatus 20 over the piles deposits such supplements on top of the piles as shown in FIGS. 3, and 4 and 6. This addition of such material provides for adding chemical compounds such as nitrogen, phosphorus, potassium sulfur to the mass treated by the apparatus 20 so that such treated mass will have the supplement evenly divided therethrough. The added material 503 may have a composition such as 16-0-0-18-3-2-2-.25 corresponding to 16% by weight of nitrogen, nothing of P or K, 18% of manganese, and 0.25% copper. In one embodiment of operation 200 pounds of such supplement 503 is added to each ton of mass as 352 to be treated by the apparatus 20 as shown in FIG. 6. The apparatus 20 and the process of this invention provides for an even distribution of such supplements throughout masses as 51, 52, 54. Such mass of manure or like material is usually impractical to handle in a manner which might provide for even dispersion of the supplement as is provided by this apparatus and process by which kelp and dairy manure may be treated as well as cow manure and chicken manure may be added to dairy manure as above described for the supplementary material for an even dispersion of such supplementary material through the main mass of material subsequently treated by the apparatus 20. The speed of the drum (which is 60 inch diameter and 8 inch further radially to the tips of the blade) may be 750-800 r.p.m. (620 r.p.m. set out in Table IV is exemplary only of the high speed of such heavy blades according to the process of this invention.)

The truck 500 travels at a substantially uniform rate of speed and the auger thereof is used to discharge supplement material as 503 to the top of piles as 54 (in FIG. 4) and 52.1 (in FIG. 3) and masses as 50 (in FIG. 6) at a uniform rate of mass or volume flow; as each of such piles has a substantially uniform vertical transverse cross-section a constant relation of rate of supplement addition to each unit of mass in the piles per foot of travel of the truck 500 is provided thereby. Accordingly, such operation of the truck 500 uniformly adds to the top of each of the piles (as 54, 52.1 and 50) prior to the flailing thereof by apparatus 20 predetermined and uniform amounts of supplement as 503 of known chemical composition. Thereafter apparatus 20 disperses such mass of supplement through the mass of such piles as 352 by flailing as above described. To determine the desired amount and composition of supplement 503 to be used, the volume and weight and the chemical composition of piles (as 359) produced by the above described process of operation of apparatus 20 is determined and the composition and the amount and analysis of supplement 503 is chosen to provide a predetermined analysis of the product of the process of treatment of the composite mass by apparatus 20 as above described for use as a fertilizer. Supplements as 503 may be chosen from the fertilizer materials comprising dairy manure and chicken manure.

Figure 13:
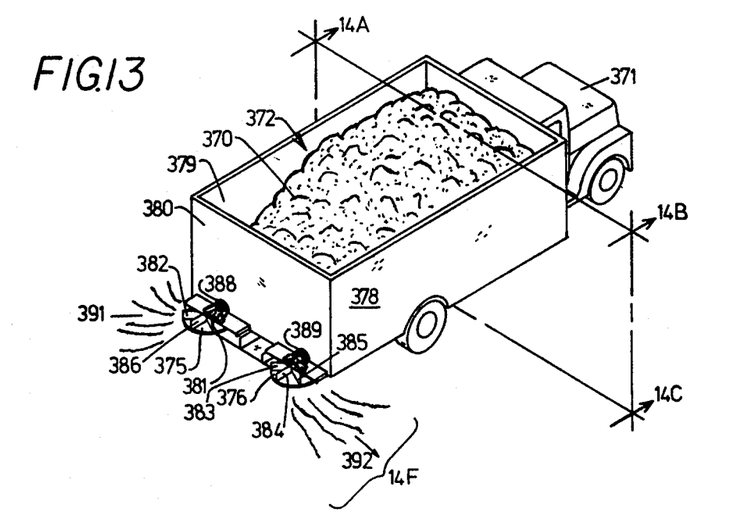
FIG. 13 is a diagrammatic perspective view of an apparatus in the process of distribution of the product of the treatment shown in FIG. 12.
Figure 14:
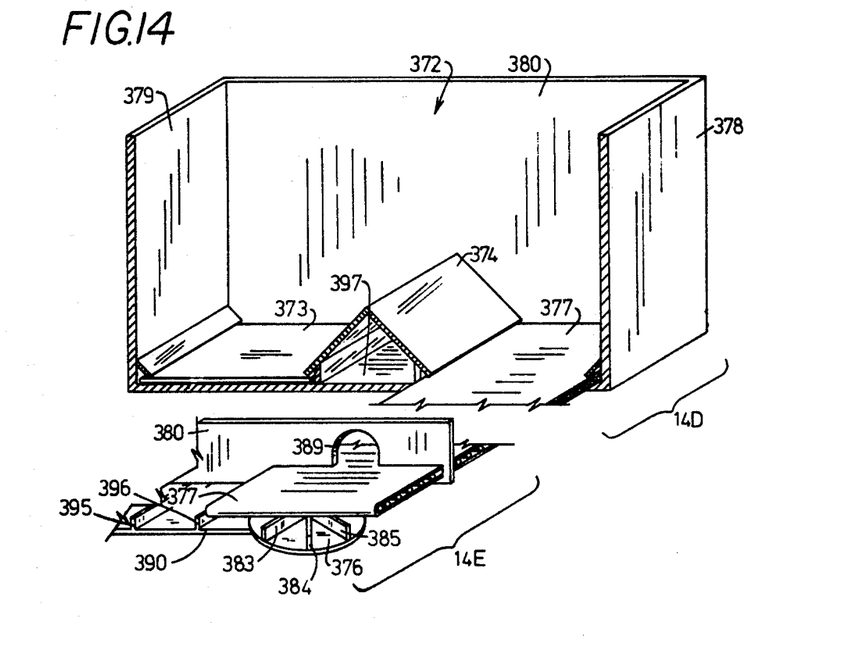
FIG. 14 is a composite diagrammatic perspective and exploded view of structures in FIG. 13.

The granular characteristics of the product are utilized in the application of such product to the soil intended to be treated thereby by a truck 371 with a load compartment 372 which carries a load 370 of the product over a field 490 to be treated therewith as well (as by a truck as 471.) A pair of 36 inch wide conveyor belts 373 and 377 passes the granular product 370 (which is the same as 470) past a splitter 374, (splitter 374 has an inverted "V" section) which is 12 inches high at its top, and 24 inches wide at its bottom edges, onto each of two counter-rotation 21½ inch diameter rigid circular disperser plates 375 and 376; the material 370 is held by and transported within side walls 378, 379, front 380 and rear walls 387 of compartment 32. The material passes through eight inch diameter holes 388 and 389 to rear end of conveyors 373 and 377. The truck body load compartment 372 has a 52 inch height and is eight feet wide and twenty-four feet long enclosing a total volume of 831.4 cubic feet and, in view of splitter 374, an effective volume of 804 cubic feet. The truck has a theoretical capacity of 3600 pounds of product with density of 45 lbs./cu. ft. and when full carries 35,720 pounds. Plate 375 rotates clockwise at 600 r.p.m.; plate 375 has a set of radially equispaced 3 inch high vertical extending flat rigid plates 381, 382 and 386 fixed thereon and plate 476 has a similar set of three radially equispaced vertically extending three inch high flat rigid plates 383, 384 and 385. The conveyors pass the product 470 onto the rear outer portion of plates 375 and 376 and the plates spray the granular product over a 12 foot wide swathes 391 and 392 on each side of the truck while the truck travels at 5–7 m.p.h. to apply from ½ to 2 tons of product 370 per acre. Plates 381–386 each extends diametrically completely across the plate therefor as 375 or 376.

A power take-off on truck 371 drives the plates 375 and 376 and conveyor belts 373 and 377.

Plates 375 and 376 are rotatably supported on support plate 390 which is firmly fixed to the bottom of floor 397 of truck compartment 372 by flanges 396 and 395.

The fuel consumption of the 212 brake horsepower engine used in apparatus 20 is about 10 gallons per hour at six m.p.h. average speed using diesel #2 fuel, costing $0.40 per gallon.

TABLE I

CUMULATIVE PERCENT RETAINED

Figure 12:
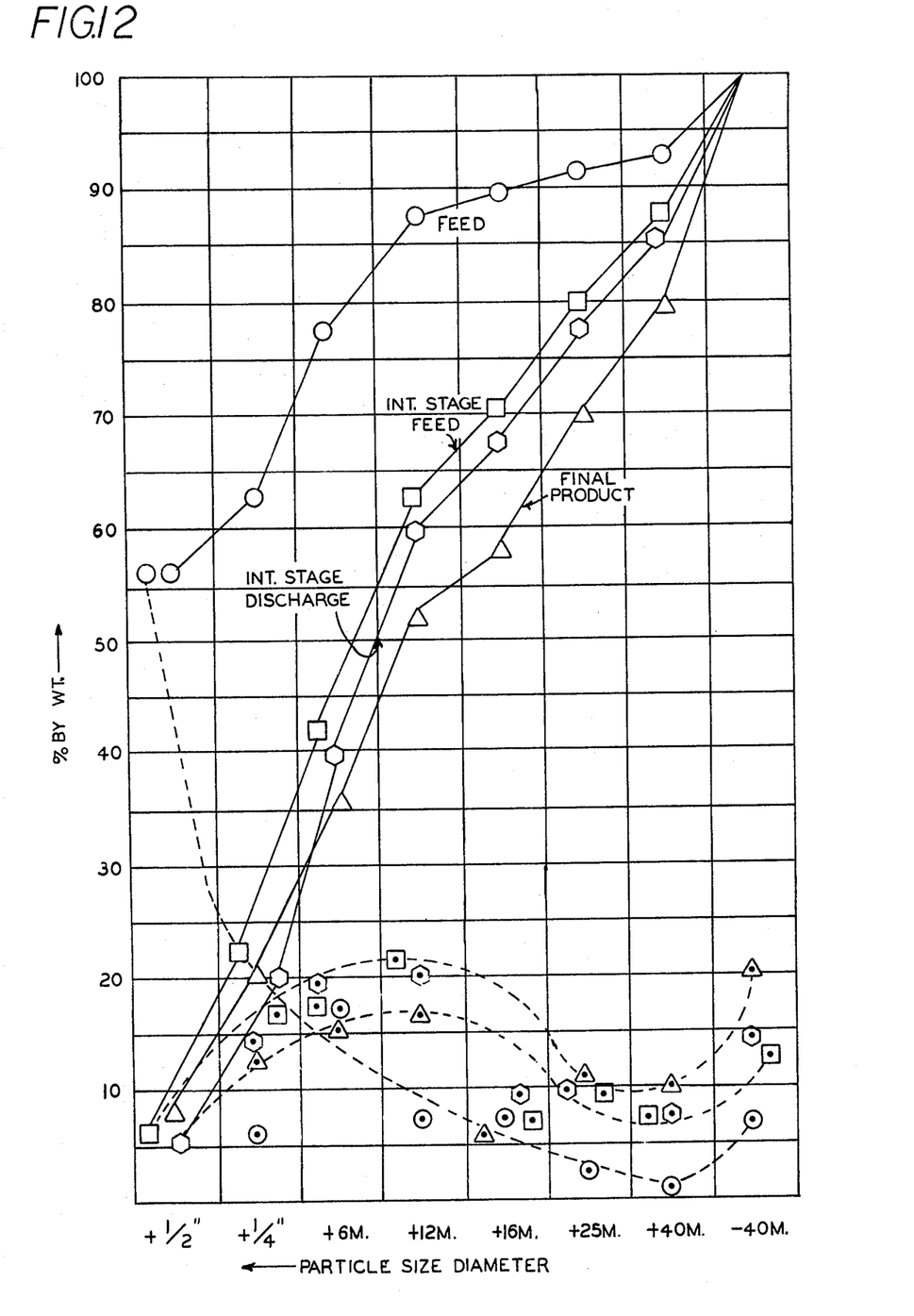
FIG. 12 is a graph of size distribution of particles in masses fed to and treated by apparatus 20.

| Sample Identification | Seive Size | | | | | | | Symbol in FIG. 12 |
| --- | --- | --- | --- | --- | --- | --- | --- | --- |
| | +½" | +¼" | +#6 | +#12 | +16 | +25 | +40 | |
| 1) Feed (Untreated Material) | 56.8 | 62.8 | 77.6 | 87.5 | 89.3 | 91.8 | 93.1 | ○ |
| 2) Feed to Intermediate Stage | 6.0 | 23.0 | 41.7 | 63.7 | 70.7 | 80.1 | 87.3 | □ |
| 3) Discharge at Intermediate Stage | 5.5 | 19.6 | 39.0 | 59.1 | 68.2 | 77.4 | 85.6 | ⬡ |
| 4) Finished Product | 8.0 | 20.6 | 35.7 | 52.3 | 58.2 | 69.7 | 79.6 | △ |

TABLE II

SIZE ANALYSIS

| Sample Identification | Seive Size | | | | | | | | Symbol in FIG. 12 |
| --- | --- | --- | --- | --- | --- | --- | --- | --- | --- |
| | "½" | +¼" −½ | −¼ +6m | −6m +12m | −12m +16m | −16m +25m | −25m +40m | −40m | |
| 1) Feed (Untreated Material) | 56.8 | 6.0 | 17.8 | 7.9 | 7.8 | 2.5 | 1.3 | 6.9 | ⊙ |
| 2) Feed to Intermediate Stage | 6.0 | 17.0 | 18.7 | 22.0 | 7.0 | 9.4 | 7.2 | 12.7 | ⊡ |
| 3) Discharge at Intermediate Stage | 5.5 | 14.1 | 19.4 | 20.1 | 9.1 | 9.2 | 8.2 | 14.4 | ⬡ |
| 4) Finished Product | 8.0 | 12.6 | 15.1 | 16.6 | 5.9 | 11.5 | 9.9 | 20.4 | ▲ |

TABLE III

MOISTURE CONTENT TESTS

| Sample Identification | Percent by Weight Moisture |
| --- | --- |
| Feed (Untreated Material) | 23.80 |
| | 24.70 |
| Feed to Intermediate Stage | 16.75 |
| | 17.05 |
| Discharge at Intermediate Stage | 27.20 |
| | 26.70 |
| Finished Product | 26.95 |

TABLE III-continued

MOISTURE CONTENT TESTS

| Sample Identification | Percent by Weight Moisture |
| --- | --- |
| | 26.95 |

TABLE IV

DIMENSIONS OF APPARATUS 20

| | |
| --- | --- |
| Drum 22: | |
| Outer diameter (201) | 16" |
| Length (left to right) | 13' 9" |
| Thickness of drive wall 204 | ⅜" |
| Usual speed | 620 r.p.m. |
| Flail 210: | |
| Width across blades 220 and 225; Length (tangentially along blade 220) | Total = 4" 2½" |
| Height of base 211 and 212 tip from drum 201 where attached | 4½" |
| Pin distance, base of 211 to centerline of pin 213 | 3½" |
| Width of base 211 and 212 measured parallel to axle 207 of drum 201 | ¾" |
| Maximum distance of flail blade from surface of drum 22 | 8" |
| Total number of flails: | 74 |
| Spacing of flails: | |
| Distance along axis of drum (adjacent flails) | 5" |
| Angular spacing of adjacent flails Arrangement as shown in FIG. 1; parallel helixes on one side of drum, and mirror image array on other side | 30° |
| Vanes 450 and 451–454: | |
| ¼ × 6" × 24" rigid steel or rubber belting on steel | |
| Chamber 25: | |
| Height (measured from ground to bottom of roof 5⁶ at front opening 28 with bottom edges of walls 41 and 42 on ground) | 56" |
| Depth (from front of front member 301 to rear of rear member 304) | 6' 0" |
| Width (from interior of side wall 41 to interior of side wall 42 at axle 207) | 14' 0" |
| Rear Wall 45: | |

TABLE IV-continued

| DIMENSIONS OF APPARATUS 20 | |
|---|---|
| Angle to plane of wall 41 Rear Wall 46: | 60° |
| Angle to plane of wall 42 | 60° |
| Tires 72 and 92: | |
| Outer diameter (Size 16.9 × 34) | 5' 0" |
| Distances: | |
| Distances from orifice 29 to | |
| (a) axle 207 center line | 38" |
| (b) line of orifices of nozzles as 401–405 | 24" |
| Top central edge of wall 45 to top central edge of wall 46 (at level of roof 56) | 7' |
| Top central edge of skirt 47 to top central edge of skirt 48 (at level of roof 56) | 5' |
| Bottom central edge of wall 45 to bottom central edge of wall 46 at level of bottom of walls 41 and 42 | 12' |
| Bottom central edge of skirt 47 to bottom central edge of skirt 48 at level of bottom of walls 41 and 42 | 10' |
| Top edge of top skirt 49 at bottom of platform 309 (at level of roof 56) to bottom horizontal edge 149 (parallel to top edge) | 2' |
| Skirt, thickness of belting | ⅜" |
| Apparatus 20 speed, maximum | 5 to 7 m.p.h. |
| Apparatus 20 weight | 18,000 lbs. |
| Engine (251) John Deere Stationary Deisel, Model 6531 AR-68 290233R, 212 Horsepower | |

I claim:

1. A process of treating masses of manure from cattle feedlots, said masses comprising dimensionally stable lumps of size in excess of ½ inch diameter and containing portions from ¼ inch diameter to −40 mesh size, which process comprises the sequence of steps of (1) arraying said masses of manure in horizontally elongated dimensionally stable ground supported piles of substantially uniform transverse cross section and exposed to the atmosphere;

(2) adding water to each of said piles to bring the percentage moisture thereof to the mass of said pile within the range of 25% to 35% water by weight;

(3) flailing portions of the resultant stationary dimensionally stable masses by passing a series of flails in one horizontal direction through an agitating zone in said stationary resultant dimensionally stable mass, said series of flails extending horizontally and transversely to said one horizontal direction, each of said series of flails moving in an upward direction while said flail moves in said one direction to selectively reduce the amount of material in said resultant mass which material is in form of lumps in excess of ½ inch in diameter, while not substantially affecting the −40 mesh particles; said flailing occurring in such agitating zone;

(4) and raising a portion of said resultant mass and creating confined zone of temporarily raised and dispersed particles above and in back of said agitating zone and adding moisture to said confined zone of temporarily raised and dispersed particles and wherein the finer particles of said resultant mass are moved to the top and center of said confined zone of temporarily raised and dispersed particles and moisture is applied to said finer particles in said confined zone concomitant in time and place with said flailing of said mass in said agitating zone, and forming from said dispersed particles an elongated treated ground supported dimensionally stable pile of granular particulate mass containing 25% to 30% by weight of water wherein said moistened finer particles selectively applied to the outside of the treated pile; and (5) after each of a plurality of periods of time during which the thus treated pile mass is subjected to bacterial action and air to form a resultant dimensionally stable treated pile, and (6) sequentially flailing successive portions of said dimensionally stable treated pile by passing a series of flails in a horizontal direction through a second agitating zone in said dimensionally stable treated pile, said series of flails extending horizontally and transversely to said last horizontal direction, each of said series of flails moving in an upward direction while said flails move in said last horizontal direction to selectively reduce the amount of material in said resulting treated pile which is in form of lumps in excess of ½ inch in diameter, while not substantially affecting the −40 mesh particles; and then raising a portion of said pile and creating a second confined zone of temporarily raised and dispersed particles above and in back of said second agitating zone and adding moisture to said raised confined second zone of temporarily raised and dispersed particles;

(7) and wherein the finer particles of said treated pile are moved to the top and center of said second confined zone of temporarily raised and dispersed particles and wherein moisture is selectively applied to the finer particles in said second confined zone concomitant in time and place with said flailing of said mass in said second agitating zone;

(8) and forming from said dispersed particles a second elongated treated ground supported heterogeneous pile of granular particulate mass containing 25% to 30% by weight of water and substantially free of odor and wherein said moistened finer particles are selectively applied to the outside of said second pile.

2. Process as in claim 1 wherein each of said periods of time is a period of time within which the temperature of the mass rises to no more than 160° F.

3. Process as in claim 2 wherein each of said periods of time is from three to four days.

4. Process as in claim 1 wherein several piles of said manure which have undergone differing numbers of said periods and following agitating are consecutively treated by said process of agitating dispersing and adding of moisture.

5. Process as in claim 4 wherein the successive portions of said granular free flowing particulate mass substantially free of odor are sequentially dispersed over fields as a dispersed granular spray.

6. Process as in claim 1 also comprising the step of adding to the top of said piles, prior to said flailing step, masses of supplement of known chemical composition and thereafter dispersing said mass of supplement through said resultant mass by said step of sequentially flailing portions thereof.

7. Process as in claim 6 wherein said supplement is chosen from the group of fertilizers comprising dairy manure and chicken manure.

8. Process as in claim 1 comprising a step of determining the chemical composition of the pile produced by said process, adding to the top of said piles, prior to said flailing step, masses of supplement of known chemical composition in an amount to provide a predetermined analysis of the product of the process, and thereafter dispensing said mass of supplement through said resultant mass by said step of sequentially flailing portions thereof.

* * * * *